United States Patent [19]

Lai et al.

[11] Patent Number: 5,404,951
[45] Date of Patent: Apr. 11, 1995

[54] WELL TREATMENT WITH ARTIFICIAL MATRIX AND GEL COMPOSITION

[75] Inventors: Quintin J. Lai, Dallas; Daniel P. Newhouse, Plano, both of Tex.

[73] Assignee: Atlantic Richfield Company, Los Angeles, Calif.

[21] Appl. No.: 88,456

[22] Filed: Jul. 7, 1993

[51] Int. Cl.⁶ ............................................ E21B 33/138
[52] U.S. Cl. ..................................... 166/295; 166/300
[58] Field of Search ............... 166/295, 294, 281, 270, 166/291

[56] References Cited

U.S. PATENT DOCUMENTS

| | | | |
|---|---|---|---|
| 3,718,189 | 2/1973 | Terry | 166/295 X |
| 3,719,050 | 3/1973 | Asao et al. | 166/295 X |
| 4,193,453 | 3/1980 | Golinkin | 166/295 |
| 4,438,976 | 3/1984 | Baughman et al. | 166/295 X |
| 4,494,606 | 1/1985 | Sydansk | 166/295 |
| 4,834,182 | 5/1984 | Shu | 166/295 |
| 4,940,091 | 7/1990 | Shu et al. | 166/295 X |
| 5,022,466 | 6/1991 | Shu et al. | 166/295 X |
| 5,071,890 | 12/1991 | Shu et al. | 166/295 X |

Primary Examiner—William P. Neuder
Attorney, Agent, or Firm—Michael E. Martin

[57] ABSTRACT

Hydrocarbon bearing earth formations are treated to reduce formation permeability and fill void spaces by injecting a polymer gel solution having an artificial matrix material dispersed therein and comprising beads of materials such as polystyrene and polycarbonate having densities substantially the same as the density of the polymer gel to improve distribution of the artificial matrix material into such void spaces.

12 Claims, 1 Drawing Sheet

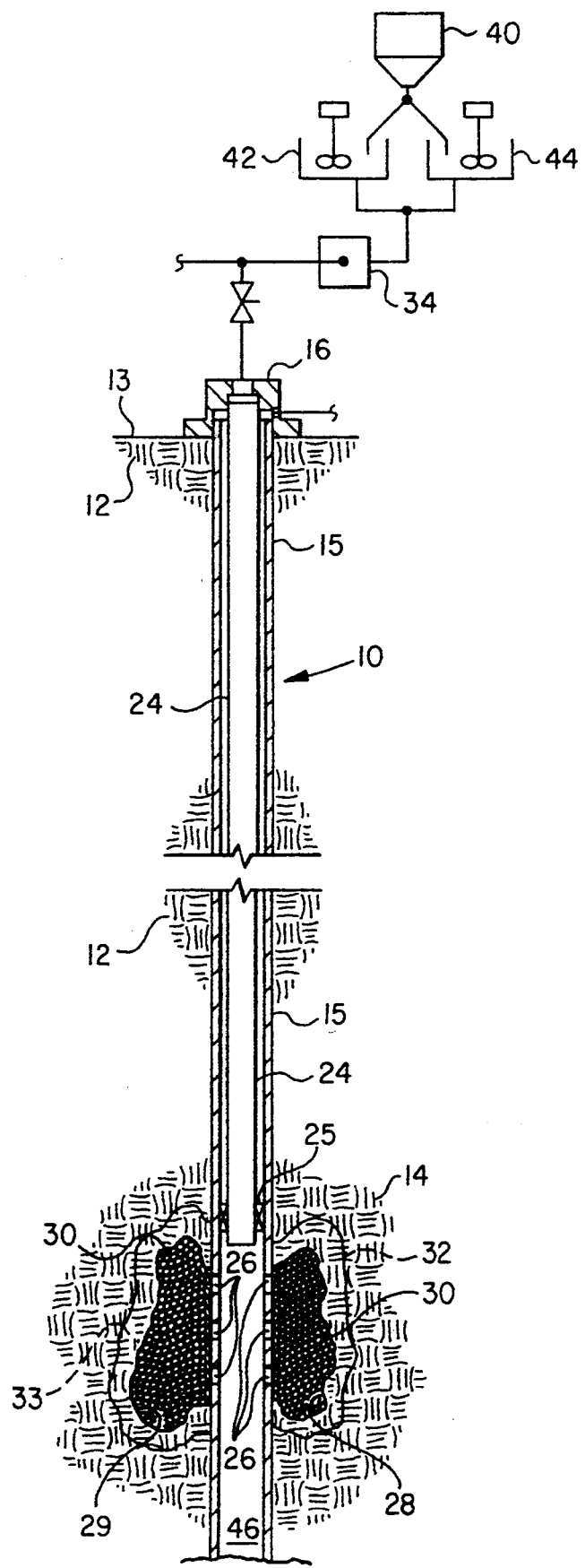

WELL TREATMENT WITH ARTIFICIAL MATRIX AND GEL COMPOSITION

BACKGROUND OF THE INVENTION

1. Field of the Invention

The present invention pertains to treating an earth formation in the vicinity of a wellbore by introducing an artificial matrix into void spaces in the formation together with a polymer gel to improve the consolidation or conformance of the formation and control the permeability thereof.

2. Background

In fluid production or injection wells, it is often necessary to reduce the permeability of certain portions of the earth formation in communication with the well to control the flow of fluids to or from the well. One technique which is employed to improve the conformance and reduce the permeability of earth formations in the vicinity of hydrocarbon fluid production wells is to inject a polymer type gel composition which forms a continuous single phase gel in the formation of sufficient strength and stability to effectively reduce the permeability of the formation to control flow of fluids in a desired direction or to prevent unwanted flow of fluids from certain portions of the formation.

In many instances, the formation consists of a matrix and certain anomalies. The anomaly is generally a void space in the formation having, of course, very high permeability relative to the formation matrix. Anomalies may include fractures, vugs, channels, caverns, wash-outs or cavities whereas the formation matrix is substantially the remainder of the formation volume characterized as essentially homogenous, continuous sedimentary material. In attempting to reduce the permeability of certain formation zones, the anomalies may present problems when the permeability reduction technique involves the injection of certain cross-linked polymer type gels, for example. Conventional polymer gels usually do not have sufficient strength to occupy an anomaly and resist the incursion of fluids into and through the anomaly. Since void spaces or "voids" often occur in the vicinity of perforations in a fluid production well, in order to plug these perforations or reduce the permeability of the formation in the vicinity of these perforations, filling the void with the gel and causing the gel to permeate into the natural matrix around the void space is not sufficient to provide a competent permeability reducing or plugging operation. The present invention has been developed with a view to improving the use of polymer gels and similar formation plugging or permeability altering compositions and associated processes.

SUMMARY OF THE INVENTION

The present invention provides an improved method for plugging or reducing the permeability of certain portions of earth formations in the vicinity of fluid producing or fluid injection wells wherein void spaces in the formation in communication with the well are filled with an artificial matrix material which is carried into the formation entrained in a suitable fluid.

In accordance with an important aspect of the invention, treatment of earth formations in the vicinity of a wellbore with polymer type gel compositions is improved by placing an artificial matrix of particles or "beads" of solid material into voids or spaces in the formation which are in fluid flow communication with the wellbore through which the polymer gel is injected. The artificial matrix material is preferably of a density substantially equal to the density of its carrier fluid so that the material will not settle nor float and leave unwanted void spaces occupied only by the gel material.

In one embodiment of the invention, a polymer gel is injected into a formation zone of interest, which also includes a void in communication with a wellbore, and wherein the polymer gel is injected into the void through the wellbore with an artificial matrix material of small plastic spheres entrained in the gel solution. The artificial matrix within the gel provides additional strength and support for the gel composition when filling void spaces and cavities in the formation. The plastic sphere artificial matrix material may be selected to be included in a variety of different polymer gels to maintain the equal or near equal density requirement.

The artificial matrix material can be added to the polymer gel and its cross linking fluid solution in a mixing tank and injected after a normal injection of polymer gel without matrix material has been performed or the matrix material can be injected into the void spaces or cavities with another carrier fluid prior to injection of the polymer gel solution. The packed matrix material will still allow the polymer gel solution to pass into and through the matrix material to penetrate into the formation matrix.

The present invention further contemplates a process of modifying the permeability of or plugging an earth formation in the vicinity of a wellbore by conditioning the well to accommodate a particular polymer gel composition followed by establishing the injectivity characteristics of the formation, followed by introducing a slurry of the artificial matrix material in a carrier fluid into the formation including, in particular, any cavities or voids desired to be filled and then pumping into the formation a sufficient volume of polymer gel to fill the pore spaces required including at least the pore volume of the artificial matrix. Finally, the well is then "shut in" for a sufficient period of time to allow the gel to set before the well is returned to fluid production or injection processes.

Those skilled in the art will recognize the above-described features and advantages of the invention together with other superior aspects thereof upon reading the detailed description which follows in conjunction with the drawing.

BRIEF DESCRIPTION OF THE DRAWING

The drawing figure is a somewhat schematic diagram of a fluid production well which has been treated in accordance with the present invention.

DESCRIPTION OF A PREFERRED EMBODIMENT

Processes have been developed for modifying the permeability of relatively high permeability regions of subterranean hydrocarbon bearing formations to improve sweep efficiencies of fluids flowing through the formation and to prevent incursion of unwanted fluids into the production zone of the formation, for example. One method of treating formations comprises injecting a polymer solution which will form a gel-like substance upon penetrating the formation to decrease its permeability. Certain types of polymers may be mixed with a cross linking agent and pumped into the formation zone of interest through a wellbore whereupon, after a predetermined period of time, the reaction between the polymer and the cross linking agent will form a gelled substance which will permanently and effectively reduce the formation permeability in the desired area or zone. U.S. Pat. No. 4,683,949, issued Aug. 4, 1987 to Sydansk, et al, discloses and claims certain high molecular weight, water soluble polymer such as acrylamide polymers which are reactable with a chromium carboxylate complex capable of cross linking the polymer and an aqueous solvent. Other gel systems may be adapted for use with the present invention, such as sulfonated acrylamide copolymer-aluminum citrate and the like. The gel components may be combined at the surface and injected into the desired treatment zone to form a continuous single phase gel. The gel may be tailored to a specific subterranean application to provide the desired gelation rate, resultant gel strength and stability to meet the demands of the treated area.

One problem with using polymer gels and other permeability and stability enhancing substances known in the prior art is the inadequate strength of these materials when occupying a void space in the formation. If formation fluid pressures are sufficient, the formation matrix bordering the void space will tend to collapse or allow fluids to penetrate into the void space to defeat the purpose of the gel treatment. A similar problem has been recognized and a solution presented therefor in application Ser. No. 07/976,602, filed Nov. 16, 1992 in the name of Joseph H. Schmidt, et al, and assigned to the assignee of the present invention. In the Schmidt, et al application, formation void spaces are treated for plugging with Portland cement mixtures by filling the void space with resin coated hydraulic fracturing proppant comprising basically a resin coated sand of a predetermined grain size.

However, the use of a material such as sand, cement particles and hydraulic fracturing proppants may not be suitable since these materials are usually more dense than the carrier fluid and have a tendency to settle out of the fluid stream, thereby rendering the filling of formation void spaces incomplete and tending to cause plugging of certain small cross sectional area flow paths before the void space filling process can be completed. Thus, the use of these types of solids materials is not considered appropriate for developing an artificial matrix for use with polymer gel type well treatment systems, in particular.

In accordance with the present invention, it has been discovered that efforts to reduce the permeability of certain formation zones of interest that may include certain void spaces is enhanced by the use of particulate solids which have specific gravities or densities substantially the same as the carrier fluid which is used to place the artificial matrix in the void spaces which are to be filled. In particular, it has been determined that an improved treatment process is obtainable when using high molecular weight, water soluble acrylamide polymers which are cross linked with a chromium/carboxylate complex to form a gel which modifies the formation permeability in the zone of interest, particularly when the formation is highly permeable or includes one or more voids. In particular, it has been determined that particulate solids comprising spherical particles of polystyrene and polycarbonate materials having diameters in the range of about 400 microns to 2.0 millimeters may be mixed with certain carrier fluids, including solutions of polymer and a cross linking agent, and injected into wellbores to fill the void spaces in the vicinity of the wellbore to provide an artificial matrix in the void spaces. Polystyrene spheres or beads with a density of from about 1.04 g/ml to 1.05 g/ml are considered suitable candidates for use with polymer gel materials of the type described in U.S. Pat. No. 4,683,949 as well as the polymer gels described in U.S. Pat. Nos. 4,724,906, issued Feb. 16, 1988 to R.D. Sydansk, 4,730,675, issued Mar. 15, 1988 to Wygant, et al, 4,968,442, issued Nov. 6, 1990 and 5,010,954, issued Apr. 30, 1991 to D.O. Faulk, and 5,082,057, issued Jan. 21, 1992 to Sydansk, all of which are incorporated herein by reference. The densities of certain ones of the aqueous polymer gel solutions described in these patents may vary from 1.0 g/ml to 1.5 g/ml. Accordingly, the aforementioned polystyrene and polypropylene compositions are suitable for use with these aqueous polymer gel solutions at the low end of the density range (0.90 g/ml to 1.05 g/ml) and for higher density injection fluids of the same family, artificial matrix beads made of materials such as polycarbonate may be used wherein the density of the bead material is in the range of 1.35 g/ml to 1.45 g/ml. Other bead materials which may be suitable include polyethylene, polypropylene, nylon, polyvinyl chloride, fluorocarbons, polyurethanes and polybutadiene. This range of materials will permit adaptation to different density and bead strength requirements. The chemical inertness of the proposed bead materials is also advantageous. The concentration of the matrix material should be limited to about 50% by weight of the mixture of matrix material and gel composition to preserve flowability and pumpability.

Polystyrene and polycarbonate beads are also advantageous for use as the artificial matrix composition in that these materials are somewhat in the category of commodities that may be purchased in bulk quantities and in an assortment of spherical bead sizes. For example, polystyrene particles having bead sizes ranging from 400 microns to 2.0 millimeters are used in making a wide variety of polystyrene foam products. Moreover, if the density of the artificial matrix bead material is not matched to the predetermined polymer gel solution and the density difference is large enough that significant settling or floating of the bead material may occur, the solution density may be varied somewhat without affecting the gelation properties. For example, it is possible to dilute the aforementioned types of polymer gel solutions with water to reduce density, or increase the solution density by adding more polymer to the solution and/or certain salts such as sodium chloride, potassium chloride and calcium chloride.

The incorporation of the artificial matrix bead material into polymer gels may be easily applied in the field as part of a conventional polymer gel treatment process. Conventional polymer gel injection processes comprise mixing an aqueous solution of the polymer and the cross linking agent at the surface and then pumping the mixture down the wellbore through coiled tubing, drill pipe or other pipe strings disposed in the wellbore wherein the solution then flows into the formation matrix and/or void through perforations in the wellbore casing, for example. When it is known that certain void spaces exist in the vicinity of or in fluid flow communication with the wellbore, the treatment process may be modified by mixing into the polymer gel mixture the artificial matrix material such as the aforementioned plastic beads of the appropriate particle size and density. These matrix materials may be added to mixing equipment used to mix the polymer and its cross linking agent and then pumped into the wellbore. If settling or floating of the matrix material is observed, the polymer solution may be modified by lowering its density, such as by adding water, or increasing its density, such as by adding more polymer and/or salt.

Preliminary laboratory experiments with polystyrene beads indicate that it is desirable to use beads which do not incorporate any "blowing agent" such as pentane and the like in the event that the beads are exposed to elevated temperatures. Moreover, pre-wetting polystyrene beads with a small amount of detergent solution, such as Alconox or a similar laboratory grade soap, before placing them in the polymer solution aids in the distribution of the beads into the polymer while preventing small air bubbles from attaching to the surface of the beads and causing fewer beads to float in the polymer solution. The addition of sodium chloride to the polymer solution also aids in sustaining suspension of polystyrene beads in the solution. Shear pressure tests and equilibrium displacement pressure tests on a polystyrene bead/polyacrylamide gel mixture having a 1:1 weight ratio of beads to gel composition indicate acceptable shear pressures and displacement pressures compared with gel composition alone. Preliminary tests also indicate that the density of some polymer gel solutions is not uniform. Accordingly, it may be desirable to provide artificial matrix beads of different sizes or densities in the solution to assure that a sufficient quantity occupies the void space without settling.

The present invention contemplates that artificial matrix materials of the type mentioned above may be delivered to voids or cavities in wellbore penetrated earth formations prior to injecting the polymer and cross linking agent solution which will eventually gel in the formation, including the artificial matrix portion. The beads may, for example, be injected with water, seawater or brine as a carrier liquid prior to injection of the polymer gel solution. In this regard, the beads may be incorporated in a wellbore conditioning treatment fluid, such as water, seawater or brine, to cool down the formation zone of interest prior to injecting the polymer gel so that the polymer gel solution will adequately penetrate the formation matrix in the zone of interest before gelation occurs. Moreover, the artificial matrix material may be injected into the formation zone of interest during injectivity tests using fluids such as water, brine or diesel fuel. Lastly, of course, the artificial matrix material may be mixed in with the polymer gel solution and pumped into the formation void spaces in sufficient volume to fill the spaces with the artificial matrix material.

Referring now to the drawing figure, there is illustrated a schematic of a well 10 penetrating an earth formation 12 including a zone of interest 14 which is to be treated in accordance with the present invention. The well 10 extends from the earth's surface 13 and is provided with a conventional casing 15 and a wellhead 16 from which depends a tubing string 24. The tubing string 24 is connected to a conventional packer 25 and terminates in the vicinity of plural perforations 26 which penetrate casing 15 and open into a void space 28, 29 which is shown already subjected to treatment in accordance with the present invention. The void spaces 28, 29 are shown filled with an artificial matrix material 30 comprising the aforementioned particles or beads of suitable plastic, for example, having a density similar to the density of the fluid which is used to carry the matrix material into the void spaces. Boundary lines 32, 33 are illustrated as indicative of the penetration of the polymer gel solution into the formation matrix beyond the boundary of the void spaces 28, 29. The drawing figure also illustrates a source of artificial matrix material comprising a hopper 40 which may be placed in communication with a selected one of mixing tanks 42 and 44, which, in turn, may be selectively placed in communication with a pump 34 for pumping a mixture of the artificial matrix material with a carrier liquid through the tubing string 24, the wellbore space 46 and the perforations 26 into the void spaces 28, 29. The carrier fluid may be any one of the liquids previously mentioned and with the particularly desired feature of having the same or approximately the same density as the matrix material 30.

Accordingly, when a conformance or permeability modifying fluid is selected which will effectively reduce the permeability of the zone of interest 14 within the boundaries of the boundary lines 32, 33, an artificial matrix material comprising, for example, polystyrene beads or polycarbonate beads, in the spherical size range mentioned above may be selected for the matrix material and having a density approximately the same as the selected polymer gel. A sufficient quantity of the polymer material in an aqueous solution, together with the cross linking agent, is then mixed in the tank 42, for example, and a quantity of matrix material 30 is also mixed in with the polymer gel carrier fluid. This mixture is then pumped into the spaces or voids 28, 29 under pressure. The polymer gel solution will permeate into the formation zone 14 at least to the exemplary boundary lines 32, 33 while the uniformly mixed and dispersed matrix material 30 substantially fills the void spaces 28, 29. When a predetermined sufficient quantity of polymer gel and matrix material has been injected into the formation, the well is then shut in a sufficient length of time to allow the cross linked polymer to set whereupon the quantity of material remaining in the tubing string 24 and the space 46 may then be flushed from the well by a gel breaker and evacuation fluid which may be injected into the space 46 through coilable tubing, not shown, for example.

The formation zone to be treated may require certain other conditioning operations. For example, if the formation temperature is one which would accelerate the setting of the polymer gel, it may be necessary to inject a cool-down treatment fluid into the formation, such as water, to lower the formation temperature in the area delimited by the boundary lines 32, 33 to a temperature which will allow proper injection and filling of the void spaces 28, 29 before the gel sets. Moreover, it may be necessary to establish the injectivity rate and pressure required for injecting the polymer gel and/or the polymer gel matrix mixture before that step is carried out. In other words, a fluid such as water, seawater or diesel fuel may be injected into the formation to determine the injectivity rate that the formation will accept without exceeding the fracture pressure at any time during the treatment.

Once the above-mentioned preliminary steps are carried out, if they are necessary, a slurry of the formation treatment material such as the aforementioned type of polymer gel with the entrained neutrally buoyant artificial matrix material is pumped into the formation through the perforations 26. Alternatively, a quantity of artificial matrix material 30 may be pre-mixed with a suitable carrier liquid such as water or seawater in the tank 44 and injected into the void spaces 28, 29 prior to injection of the polymer gel until these spaces are full of matrix material. In this way, the polymer gel may then be injected in a conventional manner since the formation is now rid of any void spaces which might adversely affect the quality of the polymer gel treatment.

Although a preferred embodiment of the present invention has been described in some detail herein, those skilled in the art will recognize that various substitutions and modifications may be made to the method described without departing from the scope and spirit of the invention as recited in the appended claims.

What is claimed is:

1. A method of treating an earth formation zone of interest to provide at least one of reduced permeability of said zone of interest to fluid flow and consolidation of said zone of interest, comprising the steps of:

injecting an artificial matrix material into said zone of interest to fill any void spaces in said zone of interest, said artificial matrix material comprising solids particles dispersed in a carrier liquid and having substantially the same density as the density of said carrier liquid to provide uniform distribution of said artificial matrix material throughout said void spaces.

2. The method set forth in claim 1 wherein:

said carrier liquid is a gel composition which is settable to reduce the permeability of said zone of interest upon injection of said gel composition thereinto.

3. The method set forth in claim 2 wherein:

said gel composition comprises a polymer and cross linking agent.

4. The method set forth in claim 3 wherein:

said gel composition is an acrylamide polymer and said cross linking agent is selected from a group consisting of a chromium/carboxylate complex and aluminum citrate.

5. The method set forth in claim 1 or 4 wherein:

said artificial matrix material is selected from a group consisting of polystyrene, polycarbonate, polyethylene, polypropylene, nylon, polyvinyl chloride, polyurethane, polybutadiene and fluorocarbon polymer.

6. The method set forth in claim 5 wherein:

said artificial matrix material comprises substantially spherical beads having a maximum diameter in the range of about 400 microns to 2.0 millimeters.

7. The method set forth in claim 5 wherein:

the density of said artificial matrix material is in the range of about 0.90 g/ml to 1.5 g/ml.

8. The method set forth in claim 1 wherein:

said carrier liquid is one of water, seawater and brine.

9. The method set forth in claim 3 including the step of:

conditioning said zone of interest prior to injection of said artificial matrix and gel composition by injecting a liquid into said formation to reduce the temperature of said zone of interest.

10. The method set forth in claim 1 or 9 including the step of:

determining the injectivity characteristics of said zone of interest by injecting a fluid consisting of at least one of water and diesel fuel at a pressure which will not exceed the fracture pressure of said zone of interest.

11. The method set forth in claim 2 including the step of:

shutting in said well a sufficient time to allow said carrier liquid to gel and reduce the permeability of said zone of interest including any void spaces which are occupied by said artificial matrix.

12. The method set forth in claim 5 including the steps of:

prewetting said artificial matrix material with a detergent solution and mixing said artificial matrix material with said carrier liquid to disperse said artificial matrix material therein.

* * * * *